(12) United States Patent
Little (10) Patent No.: US 8,295,661 B2
(45) Date of Patent: Oct. 23, 2012

(54) FLAT-TOP RESPONSE ARRAYED WAVEGUIDE GRATING

(75) Inventor: Brent E. Little, Glen Head, NY (US)

(73) Assignee: Infinera Corporation, Sunnyvale, CA (US)

(*) Notice: Subject to any disclaimer, the term of this patent is extended or adjusted under 35 U.S.C. 154(b) by 614 days.

(21) Appl. No.: 12/415,765

(22) Filed: Mar. 31, 2009

(65) Prior Publication Data
US 2010/0247036 A1 Sep. 30, 2010

(51) Int. Cl.
*G02B 6/26* (2006.01)
(52) U.S. Cl. ............... 385/28; 385/29; 385/30; 385/37; 385/43; 385/50
(58) Field of Classification Search .................. None
See application file for complete search history.

(56) References Cited

U.S. PATENT DOCUMENTS

| | | | | |
|---|---|---|---|---|
| 2007/0274632 A1* | 11/2007 | Beelen et al. | .......... | 385/37 |
| 2009/0148115 A1* | 6/2009 | Lee et al. | .......... | 385/132 |
| 2009/0220193 A1* | 9/2009 | Dragone | .......... | 385/24 |

* cited by examiner

*Primary Examiner* — Hemang Sanghavi
(74) *Attorney, Agent, or Firm* — Duane Morris LLP; David L. Soltz (57) ABSTRACT

An optical system is disclosed. The optical system includes first and second waveguides, a first dispersive element, and a coupler. The first waveguide is configured to support a first mode and a second mode of an optical input signal. The second mode being of a higher order than the first mode. The second waveguide has an input and an output and is configured to receive a portion of the optical input signal. The first dispersive element is disposed along a length of one of the first or second waveguides. The first dispersive element including a waveguide segment configured to induce a frequency-dependent phase shift in one of the portions of the optical input signal. The coupler is configured to couple the portion of the optical input signal in the second waveguide and the portion optical input signal in the first waveguide into the first waveguide. The coupling excites the second mode of the first waveguide to create a multimode optical signal.

20 Claims, 14 Drawing Sheets

FLAT-TOP RESPONSE ARRAYED WAVEGUIDE GRATING

FIELD OF DISCLOSURE

Embodiments of the invention relate to the field of optical communication devices. More particularly, the present invention relates to an arrayed waveguide grating (AWG) having a flat top response.

BACKGROUND

An Arrayed Waveguide Grating (AWG) is a device commonly used as a frequency or wavelength demultiplexer and can be viewed as a spatially dispersive lens. For example, an image received at the input of the AWG will be projected onto an output plane similar to a conventional lens, but the position of the output image on the output plane is wavelength dependent. Accordingly, the position of the output image changes as the wavelength of the input image changes.

Figure 1:
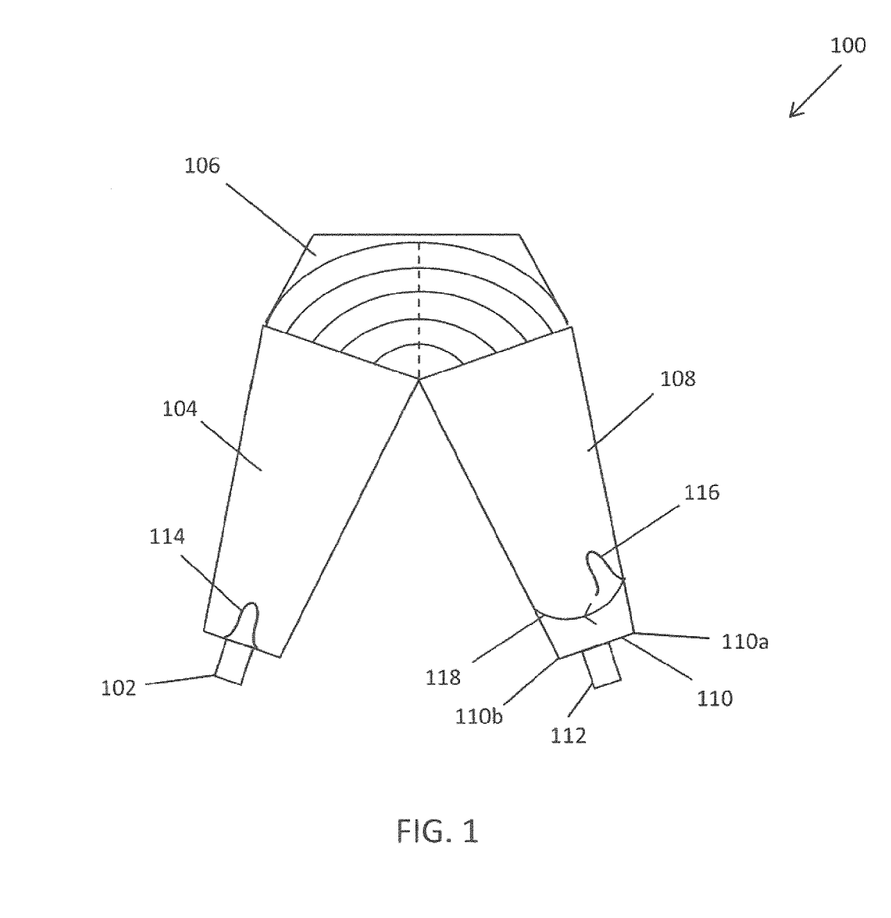
FIG. 1 illustrates a conventional arrayed waveguide grating (AWG).

FIG. 1 illustrates the components of a conventional AWG 100. As shown in FIG. 1, an input image 114 is projected from an input waveguide 102 into an input free-space propagation region 104. The image expands, or diffracts, within the input free-space propagation region 104. A waveguide array 106 is disposed at an opposite end of the input free-space propagation region 104 and collects the expanded field. Waveguide array 106 comprises a series of quasi-parallel waveguides where the length of each waveguide increases by a constant and specified amount from its inner neighbor. That is, starting from the innermost shortest waveguide, each subsequent waveguide is longer by a specified amount.

The collected field is received by the waveguide array 106 and projected into an output free-space propagation region 108. The image output from waveguide array 106 propagates through the output free-space propagation region 108 onto the output image plane 110 containing output waveguides 112. Due to the phase curvature and phase tilt induced by the waveguide array 106, the field (image) is refocused on to an output image plane 110. The output image 116 is initially received at the right side 110a of the output image plane 110 and scans from the right side 110a to the left side 110b as indicated by arrow 118. The position of the output image 116 on the output image plane 110 may be described as a function of wavelength, and the movement of the image 116 across the output image plane 110 of the AWG 100 is generally referred to as the scanning property of the AWG. For conventional AWGs, the position of the output image 116 on the output plane 110 is generally a linear function of the optical frequency.

The output waveguides 112 collect the image as it scans across the output image plane 110. Typically, the input waveguides 102 and the output waveguides 112 have the same dimensions such that, in an ideal AWG, the output image will substantially match the mode profile of the output waveguide. Accordingly, when the output image 116 is centered on an output waveguide, the transmission response from input to output is nearly 100% (i.e. unity). Because the position of the output image 116 changes with frequency, each of the output waveguides 112 will collect light at different frequencies thereby functioning as an optical frequency demultiplexer. Each of the output waveguides 112 collects the maximum amount of energy when the frequency of the output image 116 centers the output image 116 on an output waveguide 112. The amount of energy collected by an output waveguide 112 is reduces as the frequency of the output image 116 varies from the center frequency of the output waveguide 112.

Conventional AWGs in which the image position on the output image plane 110 is a linear function of frequency have Gaussian shaped frequency responses. Put another way, the amount of light collected by an output waveguide varies with the frequency of the light such that a maximum of light is collected at a single (center) frequency and is gradually reduced as the frequency varies farther and farther from the center frequency, e.g., the response is parabolic with an apex of the parabola at a single frequency. The details of the Gaussian shaped response of the AWG, such as its frequency bandwidth, are determined by the shape and refractive indices of the input and output waveguides 102, 112 as well as on the design of the entire AWG 100. The Gaussian responses of conventional AWGs 100 result in significant losses for frequencies outside of the center frequencies of the output waveguides which are not ideal in communication systems. Accordingly, an AWG with an improved response is desirable.

SUMMARY

Exemplary embodiments of the present disclosure are directed to an optical system. In one embodiment, the optical system includes first and second waveguides, a first dispersive element, and a coupler. The first waveguide is configured to support a first mode and second mode of an optical input signal. The second mode being of a higher order than the first mode. The second waveguide has an input and an output and is configured to receive a portion of the optical input signal. The first dispersive element is disposed along a length of one of the first or second waveguides. The first dispersive element including a waveguide segment configured to induce a frequency-dependent phase shift in one of the portions of the optical input signal. The coupler is configured to couple the portion of the optical input signal in the second waveguide and the portion optical input signal in the first waveguide into the first waveguide. The coupling excites the second mode of the first waveguide to create a multimode optical signal.

In another embodiment, an optical system includes first and second waveguides, a first dispersive element, a coupler, and an arrayed waveguide grating (AWG). The first waveguide is configured to support a first mode and a second mode of an optical input signal. The second mode being of a higher order than the first mode. The second waveguide has an input and an output and is configured to receive a portion of the optical input signal. The first dispersive element is disposed along a length of one of the first or second waveguides. The first dispersive element including a waveguide segment configured to induce a frequency-dependent phase shift in one of the portions of the optical input signal. The coupler is configured to couple the portion of the optical input signal in the second waveguide and the portion of the optical input signal in the first waveguide into the first waveguide. The coupling excites the second mode of the first waveguide to create a multimode optical signal. The AWG is in signal communication with an output of the first waveguide and is configured to receive the multimode optical signal from the output of the input waveguide.

In another embodiment, an optical system includes a waveguide having a coupler and a dispersive element disposed along its length. The waveguide is configured to support first and second modes of an optical input signal. The coupler is configured to receive one of the first or second modes of the optical signal and excite the other of the first or second modes of the optical input signal. The exciting of the other mode of the optical input signal generating a multimode optical signal in the waveguide. The dispersive element includes a waveguide segment configured to induce a frequency-dependent phase shift in one of the modes of the multimode mode optical signal.

DETAILED DESCRIPTION

The present disclosure will now be described more fully hereinafter with reference to the accompanying drawings, in which embodiments of the disclosure are shown. This disclosure, however, may be embodied in many different forms and should not be construed as limited to the embodiments set forth herein. Rather, these embodiments are provided so that this disclosure will be thorough and complete, and will fully convey the scope of the disclosure to those skilled in the art. In the drawings, like numbers refer to like elements throughout.

Consistent with the present disclosure, optical signals supplied on an input AWG waveguide are spatially offset from the center of the waveguide. The amount of offset is sufficient to image the optical signals onto the center of an output AWG waveguide, even though the wavelength of such optical signals would otherwise cause the optical signals to be imaged at a location other than the center of the input AWG waveguide. The spatial offset of the input optical signal is generated by splitting the optical signals into two portions, one of which is phase shifted relative to the other, and then combining the two portions onto a waveguide with a mode coupler. The mode coupler is configured to excite higher order modes in the waveguide which are associated with the phase shifted portion. The resulting multi-mode signal is spatially redistributed or offset relative to a fundamental mode of the input optical signal.

Figure 2A:
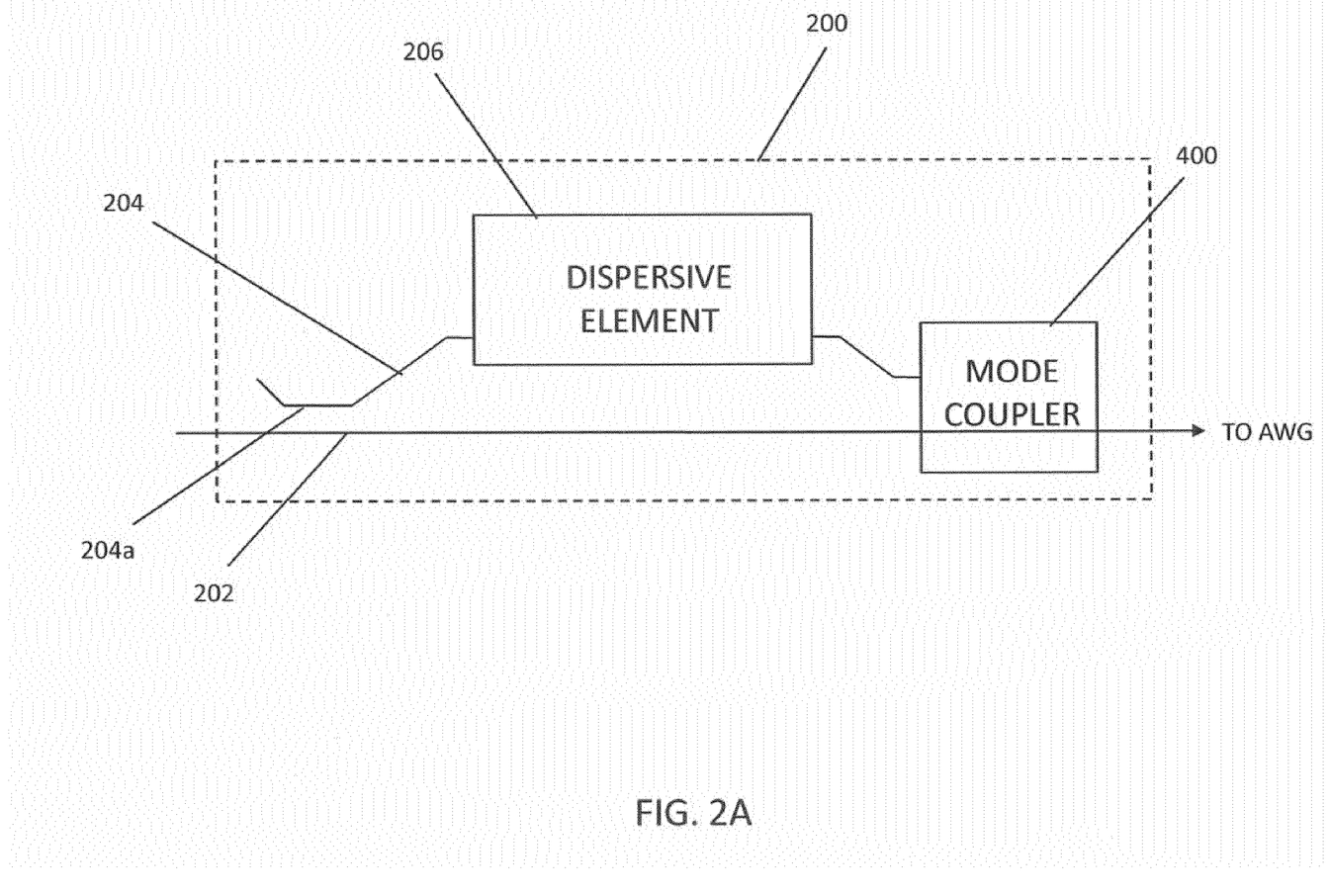
FIG. 2A illustrates one embodiment of an optical circuit configured to improve the response of an AWG.

FIG. 2A illustrates one embodiment of an optical circuit 200 configured to improve the response of a conventional AWG 100. As shown in FIG. 2A, the optical circuit 200 includes an input waveguide 202, a tap waveguide 204, a dispersive element 206, and a coupler 400 connecting the tap waveguide 204 and the input waveguide 202. The input waveguide 202 may be connected to a conventional AWG, such as the AWG 100 illustrated in FIG. 1, to improve the response of the AWG as explained below.

The input waveguide 202 receives and guides an optical input signal along its length. Tap waveguide 204 has an input 204a disposed adjacent to the input waveguide 202 such that a certain amount of power of the optical input signal may be diverted into the tap waveguide 204. The remaining power of the optical input signal that is not diverted into the tap waveguide 204 continues to propagate along the length of input waveguide 202. The tapped portion of the optical input signal propagates along the tap waveguide 204 and passes through a dispersive element 206. The dispersive element 206 is configured to induce a frequency-dependent phase shift in the tapped portion of the optical input signal. Note that although the dispersive element 206 is described as being disposed along a length of the tap waveguide 204, one skilled in the art will understand that the dispersive element 206 may be disposed along the input waveguide 202 or both the input and tap waveguides 202, 204. The dispersive element 206 may be a delay line, ring resonator, grating, or like device configured to create a frequency-dependent phase shift in an optical signal. Tap waveguide 204 may be a directional coupler, a Y-splitter, or other device used to extract a portion of an optical signal from the input waveguide 202.

In embodiments where the dispersive element 206 is implemented as a delay line, the length of the delay line may be equal to the difference between the lengths of the tap waveguide 204 and the input waveguide 202 as measured between the location of the tap waveguide 204 and the coupler 400. The differential length determines the frequency periodicity of the phase of the optical signal. For example, if the desired periodicity is 100 GHz for an optical signal having a wavelength of 1.55 µm and the effective mode index of the tap waveguide 204 is 1.75, then the differential delay length will be approximately 1.7 mm.

In embodiments where the dispersive element 206 is implemented as a ring resonator, the circumference of the ring determines the periodicity of the phase of the optical signal, and the magnitude of the coupling from the tap waveguide 204 into the ring resonator determines the slope of the dispersion, e.g., the rate of change of the dispersion. The coupling from the tap waveguide 204 and the ring resonator may be made tunable by using the thermo-optic effect as is understood by one skilled in the art. Implementing the dispersive element 206 as a ring resonator enables the ability to vary the periodicity and the dispersion slope of the optical signal compared to implementing the dispersive element 206 as a delay line which only enables the periodicity to be varied.

Figure 3:
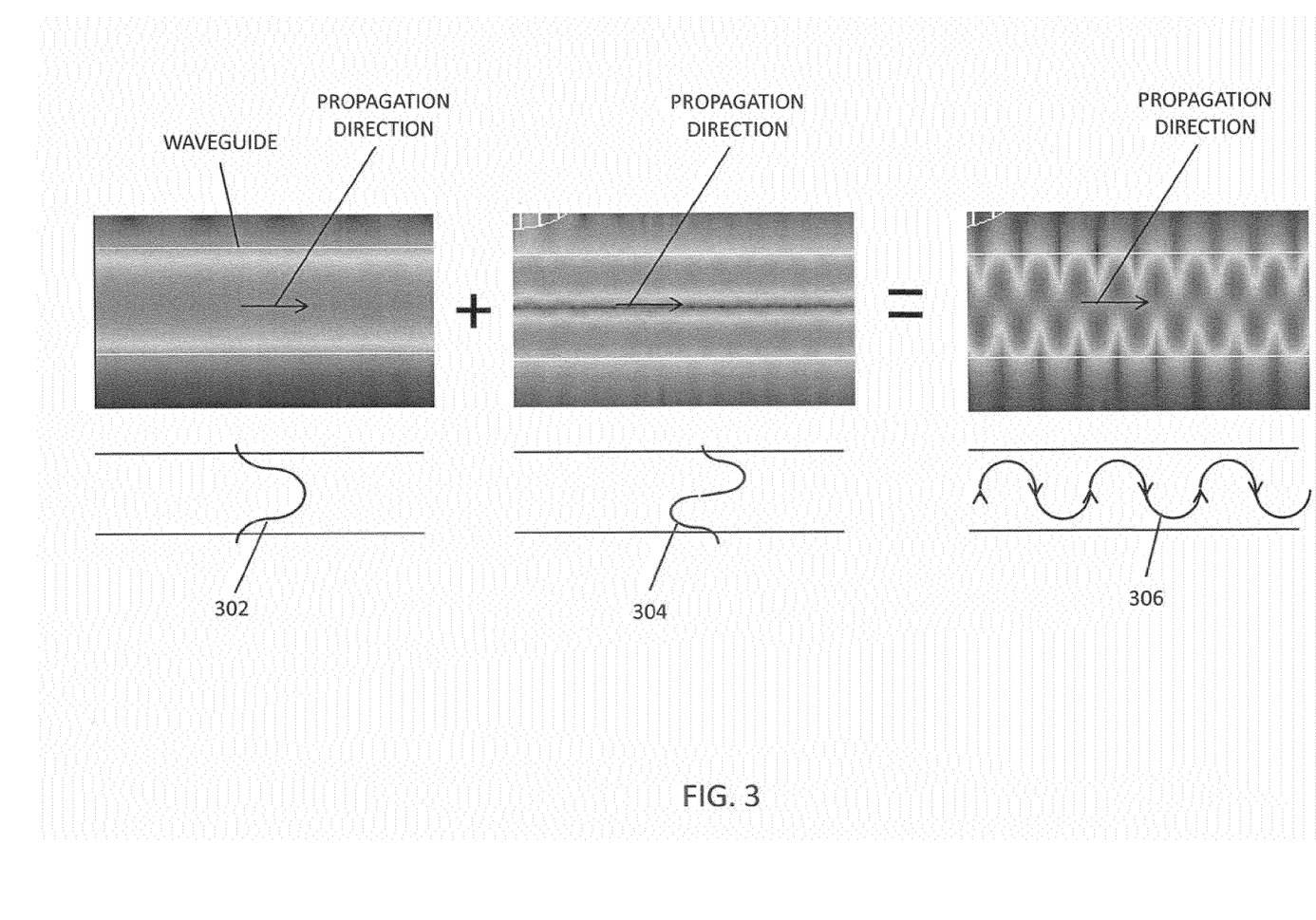
FIG. 3 illustrates a simulation of a fundamental multimode optical signal, a first higher order mode of the multimode optical signal, and the resultant optical signal of the combination of the fundamental multimode and the first higher order mode.

Coupler 400 is configured to excite a higher order mode of the portion of the optical input signal traveling along the input waveguide 202 by coupling the portion of the optical input signal propagating along the tap waveguide 204 into input waveguide 202. Combining a higher order mode and the fundamental mode of the input waveguide 202 results in an oscillating combined field. FIG. 3 illustrates a fundamental mode 302, a first higher order mode 304, and the resultant field 306. Inputting the oscillating resultant field 306 into an AWG 100 advantageously changes the location of the optical signal at the input of the AWG, which has the effect of creating so called "stationary points" in the output image 116, whereby wavelengths which would otherwise be imaged at a location spaced from the center of the output waveguide are imaged onto the waveguide. The transmission of such wavelengths is increased and the passband of the AWG is substantially flattened to yield and improved spectral response.

Figure 2B:
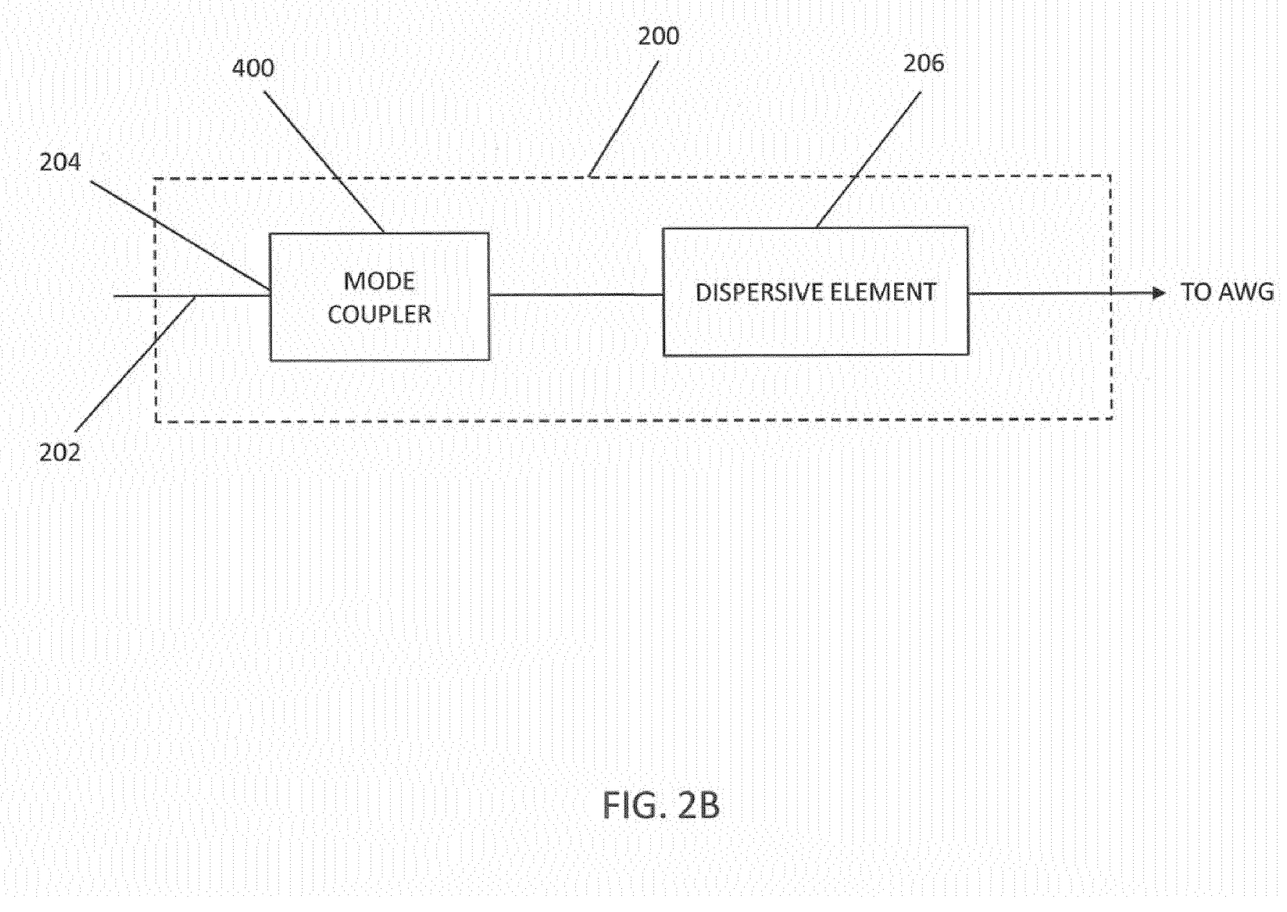
FIG. 2B illustrates another embodiment of an optical circuit configured to improve the response of an AWG.
Figure 4:
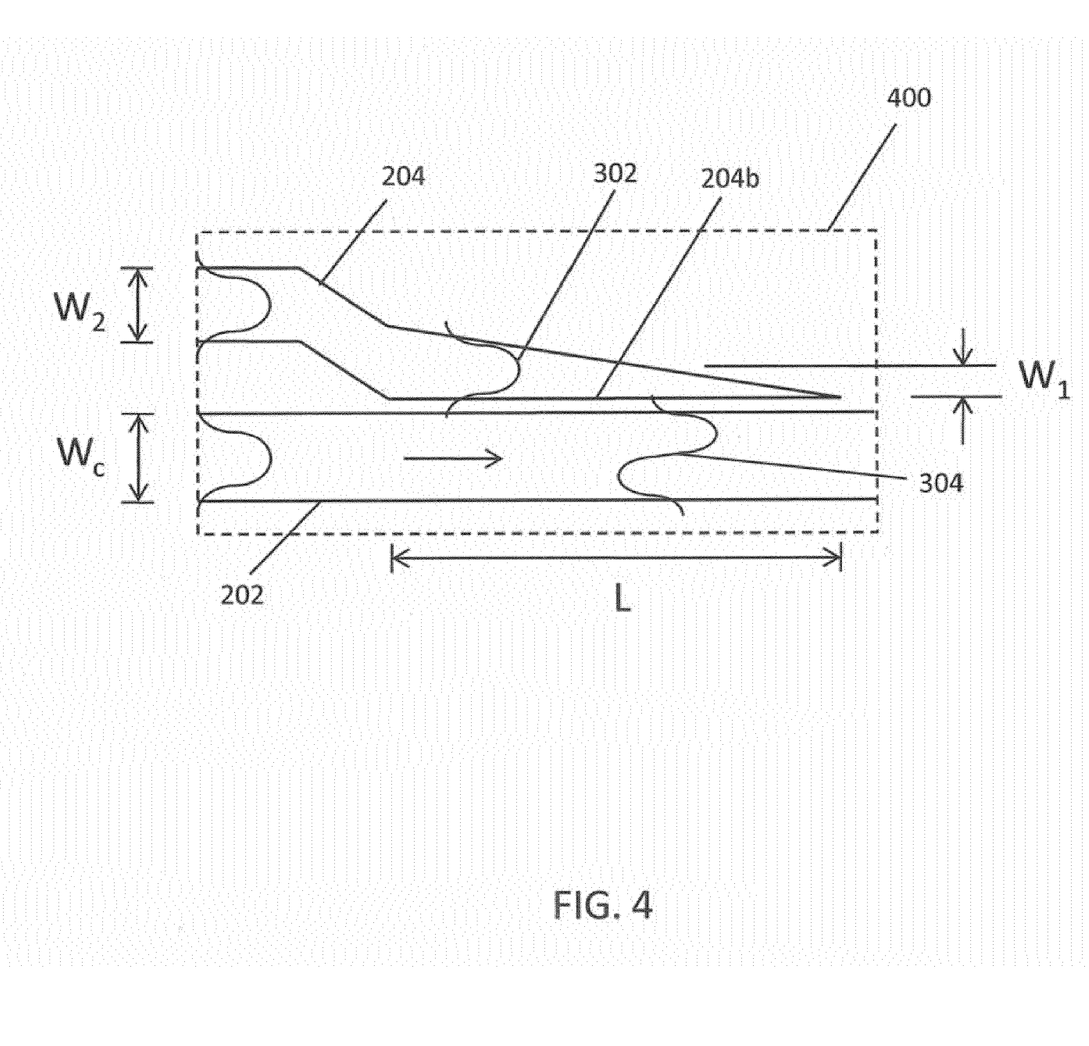
FIG. 4 illustrates one implementation of an optical coupler in accordance with the optical circuit illustrated in FIG. 2A.

Coupler 400 may be any device configured to excite another mode of the optical input signal traveling along the input waveguide 202. FIG. 2B illustrates an embodiment of an optical circuit 200 configured to improve the response of an AWG 100. in which the coupler 400 is implemented as a grating coupler followed by a mode-dependent dispersive element 206. The grating coupler may be formed by periodic waveguide side perturbation, etched periodic perturbation, permanent index perturbation, tunable thermo-optical heater perturbation, or the like. The dispersive element may be a long length of a multimode waveguide since different order modes travel at different phase velocities in a multimode guide. Accordingly, differential dispersion may be achieved by having a length of a multimode waveguide that is long enough for to induce a frequency-dependent phase shift between the two or more modes traveling along the waveguide. FIG. 4 illustrates one example of a coupler 400. As shown in FIG. 4, coupler 400 includes a portion of the input waveguide 202 and a portion of the tap waveguide 204. As described above, input waveguide 202 may be configured to support a fundamental mode and at least one other order mode along its length. The tap waveguide 204 is arranged such that its output 204b is in close proximity with the input waveguide 202 such that it is configured to evanescently couple the portion of the optical input signal traveling along the tap waveguide 204 into the input waveguide 202 and excite a higher order mode of the portion of the optical input signal traveling along the input waveguide 202.

In order to couple the portion of the optical input signal in the tap waveguide 204 into the input waveguide 202, the coupler 400 is designed so that the portion of the optical input signal traveling along tap waveguide 204 has a higher effective index than the effective index of the first higher order mode of the input waveguide 202. This may be accomplished by decreasing the width of the tap waveguide 204 from a first width, $W_1$, to a second width, $W_2$, near its output 204b such that the width, $W_2$, near the output of tap waveguide 204 is less than the width of the input waveguide, $W_c$. The width of the tap waveguide 204 may be decreased by implementing an adiabatic taper having a length, L. The adiabatic taper has a rate of change that is sufficiently slow that the optical signal is not lost to radiation modes or is not coupled to any other modes in either the tap waveguide 204 or the input waveguide 202. However, it is also possible to adjust the width of input waveguide 202 using an adiabatic taper as will be understood by one skilled in the art.

Figure 5A:
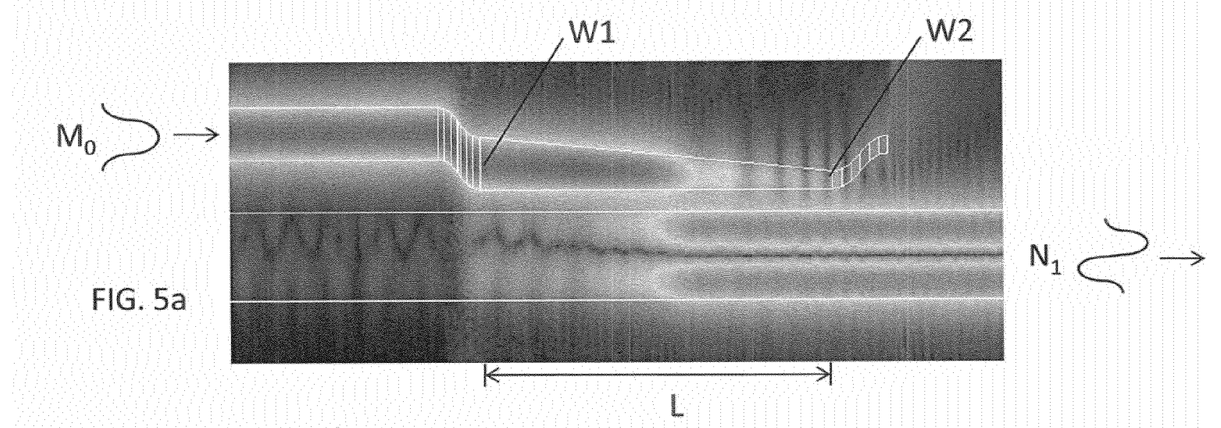
FIG. 5A is a simulated coupling of a fundamental mode being coupled into a first higher order mode in accordance with the optical coupler illustrated in FIG. 4.
Figure 5B:
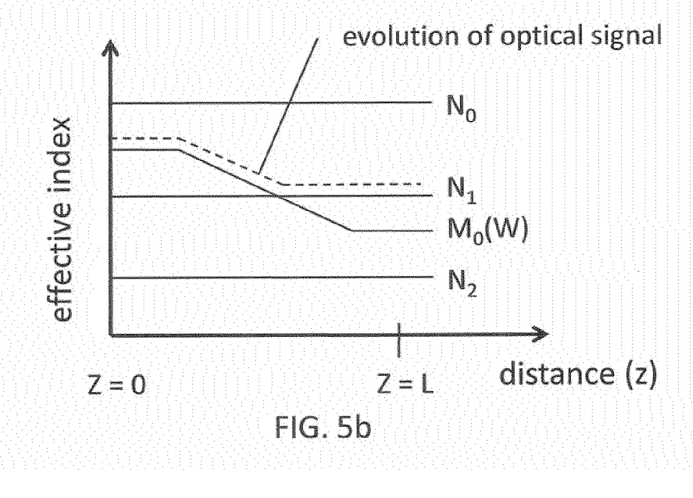
FIG. 5B is a graph of effective index versus distance of the coupler shown in FIG. 5A.

FIG. 5A is a simulation of the coupler 400 illustrated in FIG. 4 in which the fundamental mode, $M_0$, of the tap waveguide 204 is coupled into the input waveguide 202 and excites the first higher order mode, $N_1$, in the input waveguide 202. FIG. 5A was simulated for an optical signal having a wavelength of 1.55 µm in a waveguide core having an index of 1.65 and the surrounding cladding having an index of 1.45. The width, $W_c$, of the input waveguide was 2 µm, the initial width, $W_1$, of the tap waveguide 204 was 1.5 µm, the final width, $W_2$, of the tap waveguide 204 was 0.6 µm, and the length, L, of the adiabatic taper was 500 µm. FIG. 5B is a graph of effective index versus the width, W, of the input waveguide 202, illustrating the evolution of the optical signal illustrated in FIG. 5A. As shown in FIG. 5B, the effective index, $M_k(W)$, is a function of width, W, of the input waveguide 202.

Figure 5C:
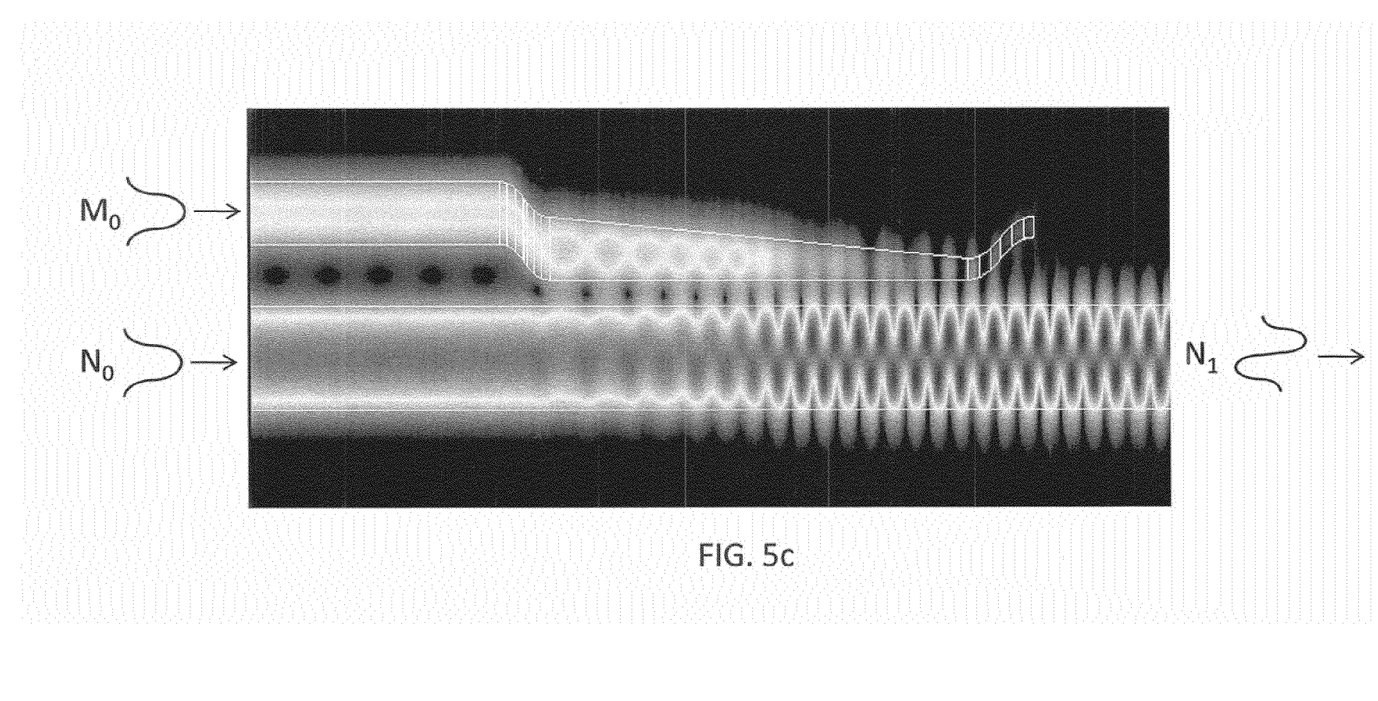
FIG. 5C is a simulated coupling of a portion of an input signal traveling in a first waveguide being coupled into the remaining portion of the optical input signal traveling in a second waveguide in accordance with the optical coupler illustrated in FIG. 4.

The amount of power tapped into tap waveguide 204 may be used to determine the shape of the output response of an AWG 100 including the degree of flattening, the in-band ripple, and the bandwidth of the response of an AWG 100. For example, FIG. 5C illustrates a simulation of a fundamental mode, $M_0$, of tap waveguide 204 exciting a first higher order mode, $N_1$, in the input waveguide 202. The fundamental mode, $M_0$, of tap waveguide 204 was generated by tapping ten percent of the power of the fundamental mode, $N_0$, of the optical signal traveling along the input waveguide 202.

Figure 6A:
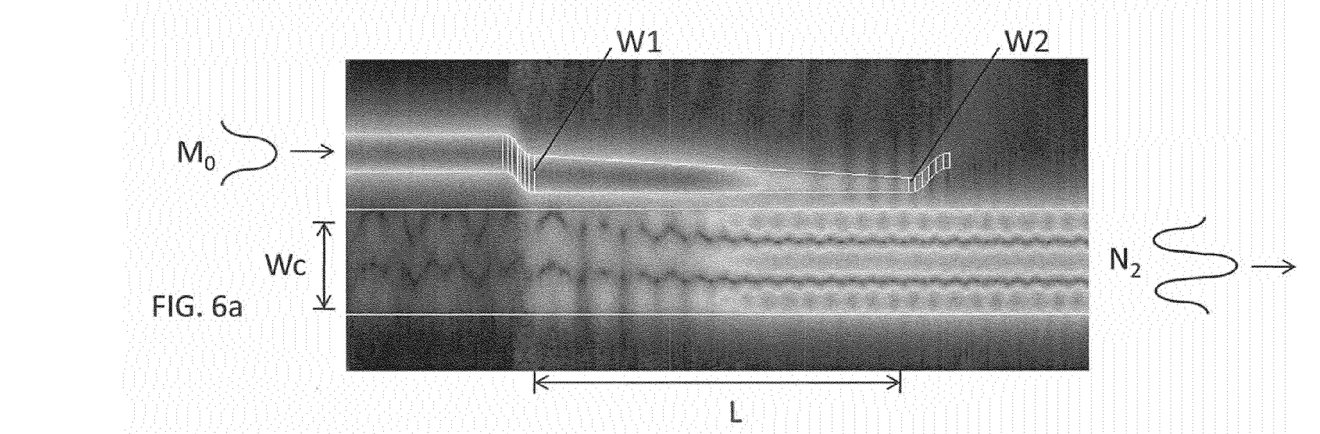
FIG. 6A is a simulated coupling of a fundamental mode of a tap waveguide being coupled into and exciting a second higher order mode of an input waveguide in accordance with the optical coupler illustrated in FIG. 4.
Figure 6B:
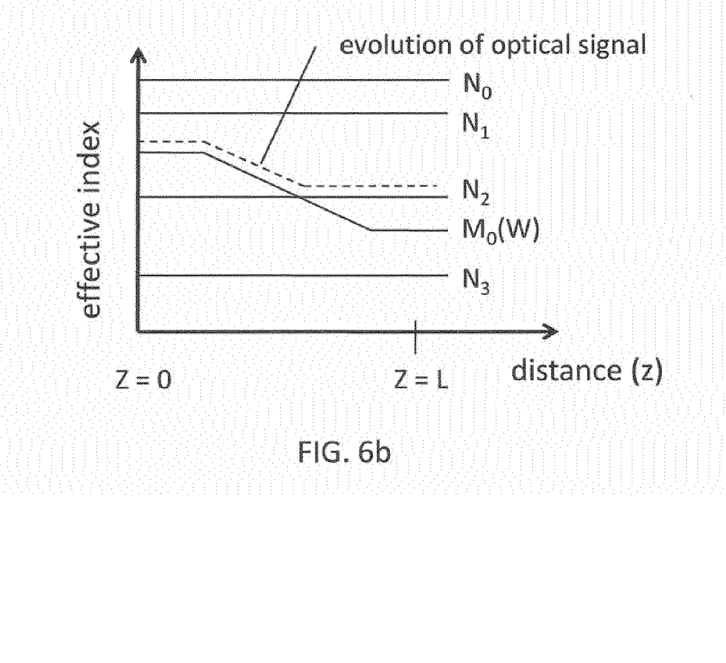
FIG. 6B is a graph of effective index versus distance of the coupler shown in FIG. 6A.

Coupler 400 may also be configured to excite a mode of a higher order than the first higher order mode, $N_1$. For example, coupler 400 may be designed such that a second ($N_2$), third ($N_3$), fourth ($N_4$), or other higher order mode signal in the input waveguide 202 may be excited. FIG. 6A is a simulation showing a fundamental mode, $M_0$, in the tap waveguide 204 being coupled into the input waveguide 202 and exciting the second higher order mode, $N_2$, in the input waveguide 202. The simulation was performed using a tap waveguide 204 and an optical signal each having the same characteristics as the optical signal described above with reference to FIGS. 5A and 5B, but the width, $W_c$, of the input waveguide was increased to 4.2 µm. FIG. 6B is a graph of effective index versus distance illustrating the evolution of the optical signal illustrated in FIG. 6A.

Figure 7A:
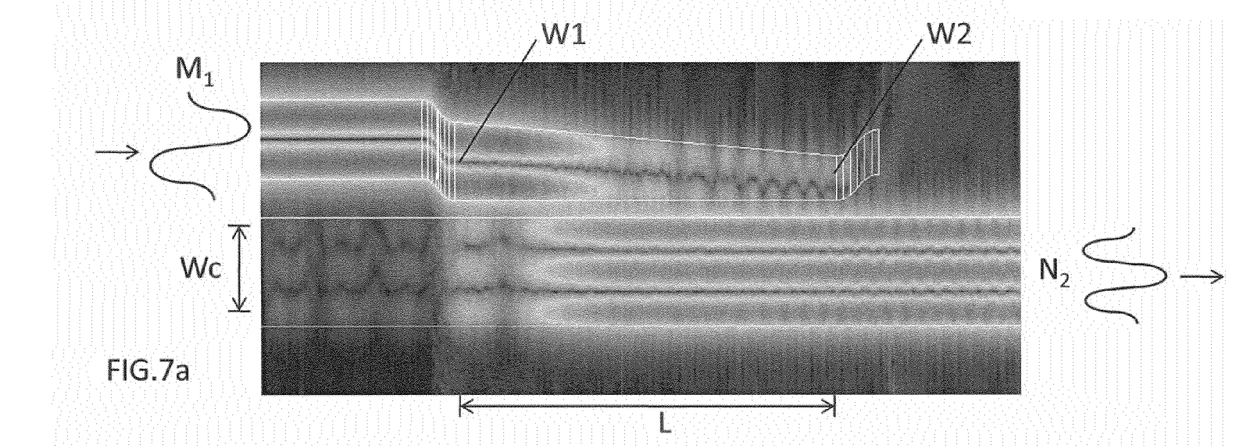
FIG. 7A is a simulated coupling of a first higher order mode of a tap waveguide being coupled into and exciting a second higher order mode of an input waveguide in accordance with the optical coupler illustrated in FIG. 4.
Figure 7B:
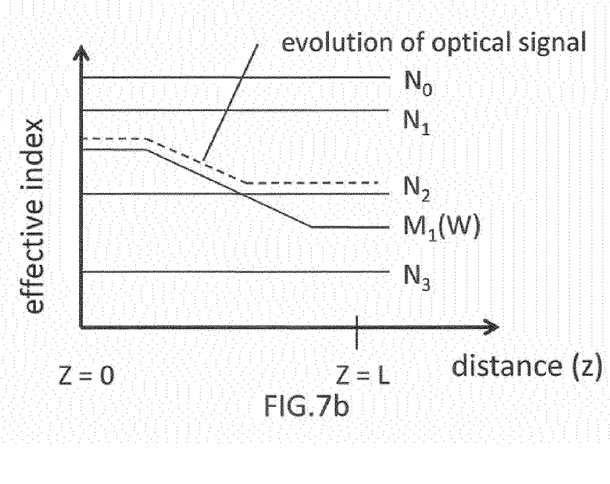
FIG. 7B is a graph of effective index versus distance of the coupler shown in FIG. 7A.

Coupler 400 may also be configured to generate higher order modes (e.g., $N_1$, $N_2$, $N_3$, etc.) in the input waveguide 202 using a higher order mode (e.g., $M_1$, $M_2$, $M_3$, etc.) in the tap waveguide 204. FIG. 7A is a simulation showing a first higher order mode, $M_1$, in the tap waveguide 204 exciting a second higher order mode, $N_2$, in the input waveguide 202. The simulation was performed using a tap waveguide 204 having an initial width, $W_1$, of 3.0 μm, a final width, $W_2$, of 1.7 μm, and an adiabatic taper length, L, of 700 μm. The input waveguide 202 has a width, $W_c$, of 4.2 μm and the optical signal had the same characteristics of the optical signal described above with respect to FIGS. 5A and 5B. FIG. 7B is a graph of effective index versus distance illustrating the evolution of the optical signal illustrated in FIG. 7A.

Figure 8A:
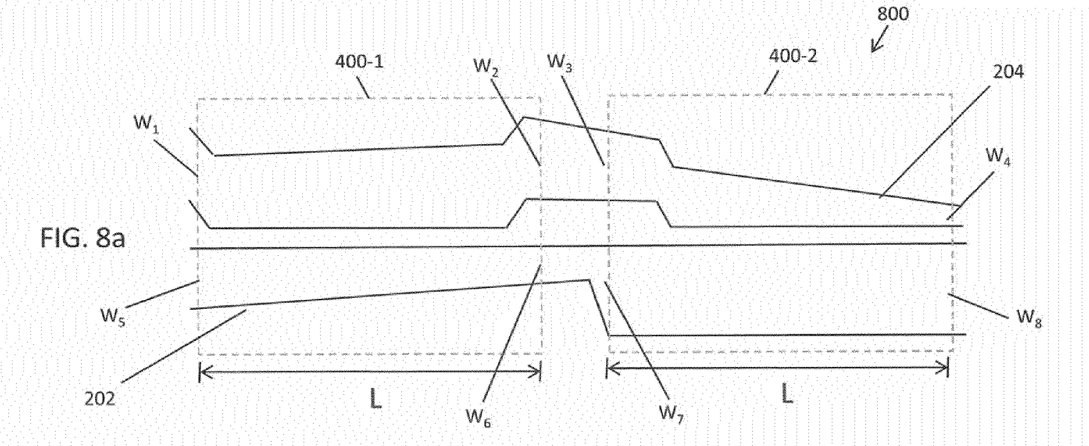
FIG. 8A illustrates one example of a cascade of couplers forming a mode changer.

As illustrated in FIG. 8A, multiple couplers 400 may be cascaded to form a mode converter 800 comprising first and second couplers 400-1, 400-2. The first coupler 400-1 receives the fundamental mode, $N_0$, in the input waveguide 202 and excites the first higher order mode, $M_1$, in the tap waveguide 204. The second coupler 400-2 uses the first higher order mode, $M_1$, in the tap waveguide 204 to excite the second higher order mode, $N_2$, in the input waveguide 202.

Figure 8B:
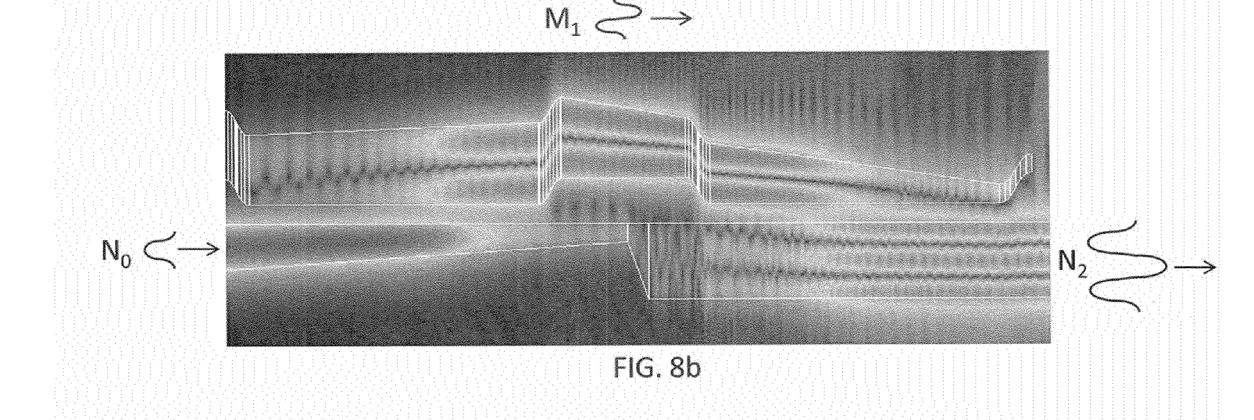
FIG. 8B is a simulation of a fundamental mode of an input waveguide being changed into a second higher order mode in accordance with the mode changer illustrated in FIG. 8A.

FIG. 8B is a simulation of the mode converter 800 illustrated in FIG. 8A. The simulation was performed using an optical signal having a wavelength of 1.55 μm in a waveguide core having an index of 1.65 and the surrounding cladding having an index of 1.45. The first coupler 400-1 was implemented with the input waveguide 202 having an initial width, $W_5$, of 1.5 μm that adiabatically tapers to a second width, $W_6$, of 0.6 μm over a length of 700 μm. The tap waveguide 204 was implemented as having an initial width, $W_1$, of 2.3 μm that adiabatically tapers to a second width, $W_2$, of 2.7 μm. The tap waveguide 204 then adiabatically tapers from tapers from the second width, $W_2$, to a third width, $W_3$, of 2.0 μm between the first mode coupler 400-1 and the second mode coupler 400-2. The second mode coupler 400-2 was implemented having the input waveguide 202 having a width, $W_7$, $W_8$, of 0.6 μm. The tap waveguide 204 of second mode coupler 400-2 adiabatically tapers from a width, $W_3$, of 2.0 μm to a fourth width, $W_4$, of 0.6 μm.

Figure 10:
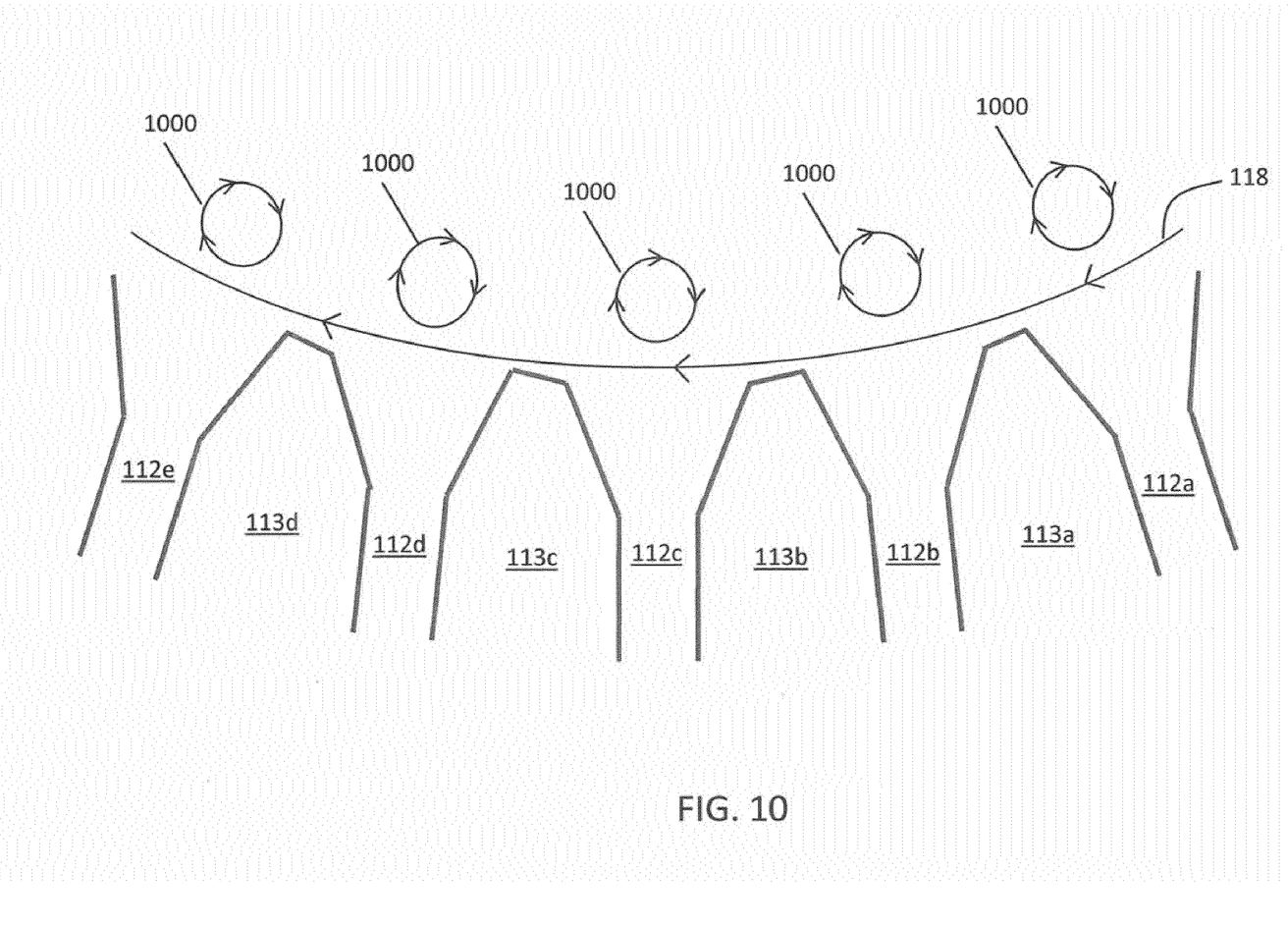
FIG. 10 illustrates an optical signal output by a system in accordance with the optical circuit illustrated in FIG. 2A as it is received by output waveguides of an AWG.

Creating an optical signal having two excited modes, e.g., a fundamental mode and a higher order mode, creates a combined or resultant field 306 having an oscillating profile. The dispersive element 206 disposed along the length of one of the input waveguide 202 or the tap waveguide 204 makes the oscillations of the combined field 306 frequency dependent such that the location of the combined field 306 at the input of the AWG 100 depends on the relative phase difference between the two combined modes. When input into an AWG 100, the combined field 306 periodically moves as a function of frequency at the input of the AWG 100 which in turn creates stationary points 1000 at the output waveguides 112a-112e of the AWG 100 as illustrated in FIG. 10. The stationary points 1000 are created as a result of the oscillation of the combined field 306 countering the scanning function of the AWG 100. The period of oscillation of the combined field 306 correlates with the periodic wavelength or frequency spacing of the center of the output waveguides 112a-112e. Thus, as the output image scans across the output waveguides 112a-112e as indicated by arrow 118, the stationary points 1000 are created over the center of the output waveguides 112a-112e for certain frequencies. As a result, the passband of the output waveguides 112a-112e is advantageously flattened. Additionally, creation of the stationary points 1000 results in a faster roll-off of the out-of-band frequencies and an improved response from the AWG 100.

The response of an AWG 100 may be further improved by providing a plurality of tap waveguides 204 forming a "chain". A coupler 400 for each tap waveguide 204 may also be implemented as well as a chain of dispersive elements for each tap waveguide 204 and coupler 400 pair. The chain of tap waveguides 204 in combination with the plurality of couplers 400 and dispersive elements 206 enables the manipulation of additional higher order modes of the optical input signal. Manipulating additional higher order modes of the optical input signal results in an AWG response that is more ideal, e.g., a flattened or other desired response shape of the AWG.

Figure 11A:
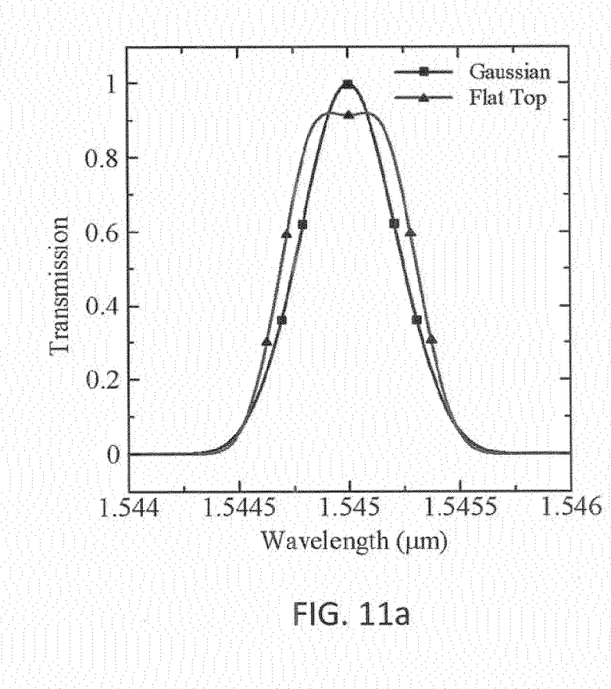
FIG. 11A is a graph of transmission versus frequency showing the loss associated with a conventional AWG and the loss associated with an optical circuit in accordance with FIG. 2A.
Figure 11B:
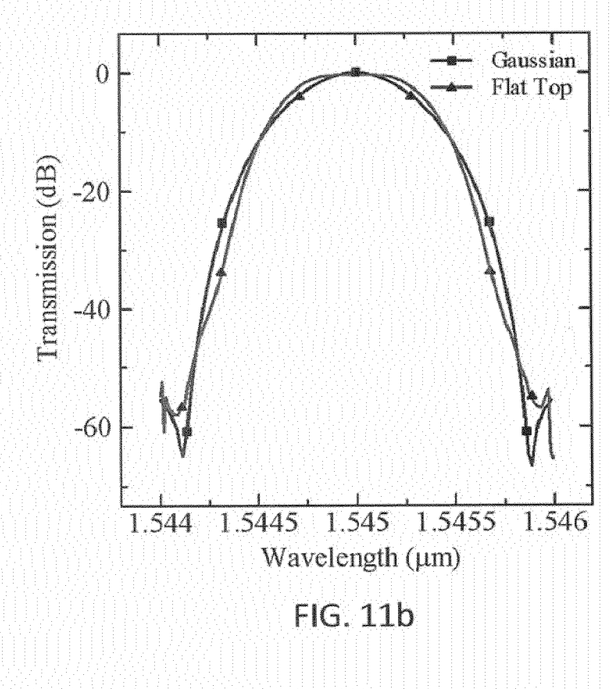
FIG. 11B is a graph of transmission in dB versus frequency showing the loss associated with a conventional AWG and the loss associated with an optical circuit in accordance with FIG. 2A.
Figure 12A:
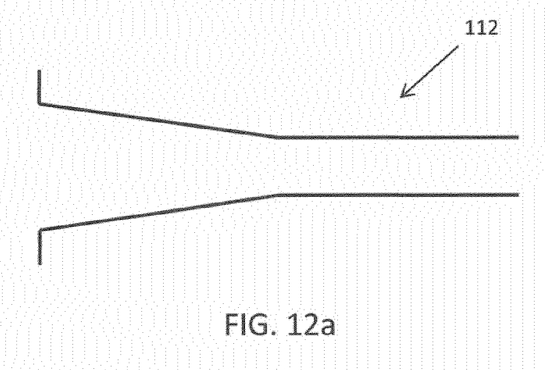
FIG. 12A illustrates a conventional adiabatic taper that may be implemented to collect the image at the output of an AWG in accordance with the system illustrated in FIG. 2A.

FIGS. 11A and 11B illustrate the response of the output a conventional AWG 100 and the output of an AWG 100 configured with an optical circuit 200 in accordance with the present disclosure. As shown in FIGS. 11A and 11B, the response of the conventional AWG 100 is Gaussian whereas the response of the AWG 100 configured with the optical circuit 200 has a flattened passband with a faster roll-off away from the center wavelength (e.g., out-of-band signals). FIG. 11A also illustrates that in some instances a small loss on the order of 0.5 dB may be incurred by implementing an optical circuit 200. The loss results from the output of an AWG 100 being single mode, and thus power in the higher order modes are stripped off and lost. A conventional AWG output waveguide 112 is illustrated in FIG. 12A.

Figure 12B:
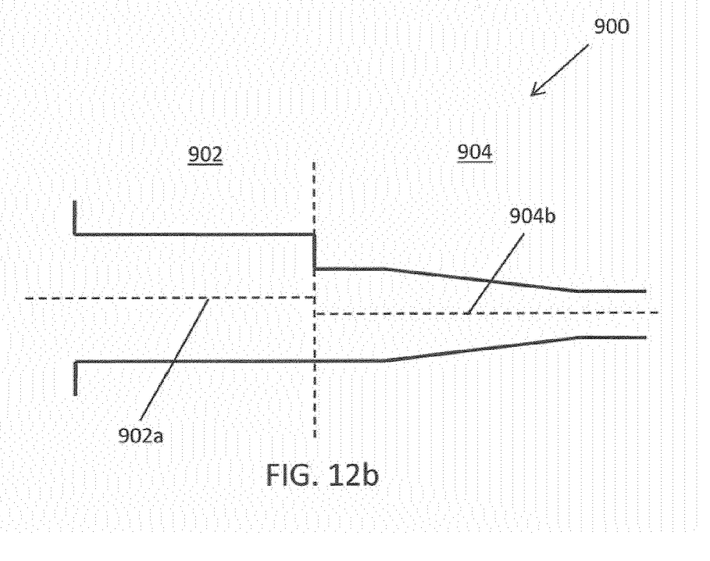
FIG. 12B illustrates an improved interferometric combiner that may be implemented to collect the output image of an AWG in accordance with the system illustrated in FIG. 2A.

FIG. 12B illustrates an improved output waveguide 900 that may be implemented to regain the higher order modes. As illustrated in FIG. 12B, the output waveguide 900 includes a rephasing portion 902 having a width that is greater than the width of the remaining portion 904. The rephasing portion 902 and the remaining portion 904 are connected such that a central axis 902a of the rephasing portion 902 is not aligned with a central axis 904a of the remaining portion 804. As the fundamental mode 402 and the first higher order mode 404 propagate along the rephasing portion 902, they are interferometrically combined at the junction between the rephasing portion 902 and the remaining portion 904 such that the output of the remaining portion 904 matches the fundamental mode of the output waveguide 900. Thus, the sum of the fundamental mode and the first higher order-mode are recaptured into the fundamental mode of the output waveguide 900 thereby improving transmission and reducing loss. One skilled in the art will understand that a variety of multimode interference couplers may be implemented as an output waveguide 900.

Figure 13A:
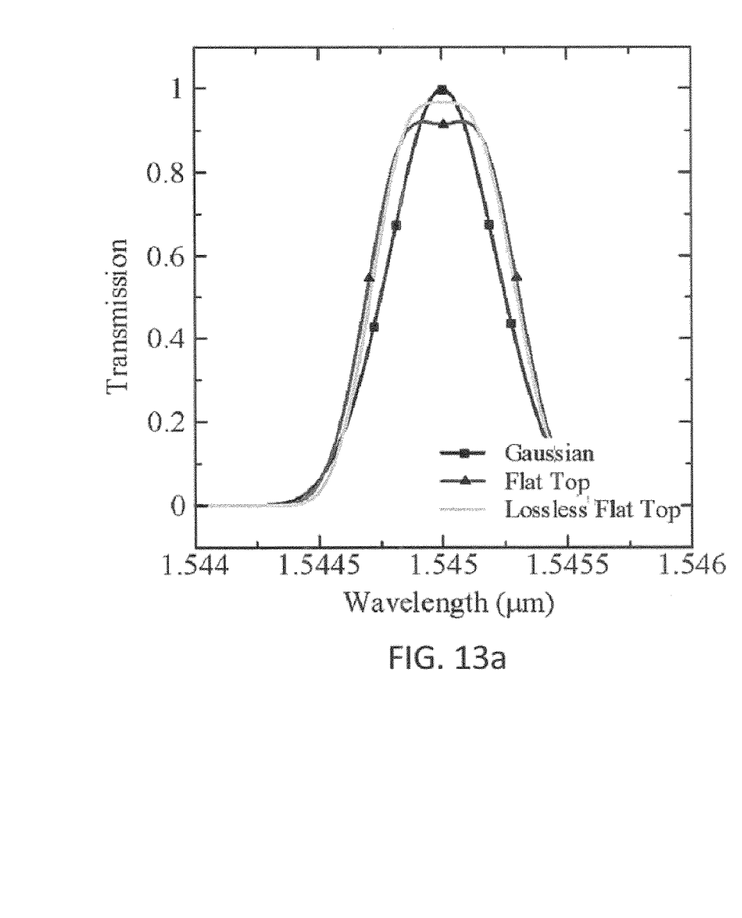
FIG. 13A is a graph of transmission versus frequency showing the loss of a conventional AWG, the loss associated with an optical circuit illustrated in FIG. 2A implemented with an adiabatic coupler, and the loss associated with a system illustrated in FIG. 2A implemented with an interferometric combiner as illustrated in FIG. 12B.
Figure 13B:
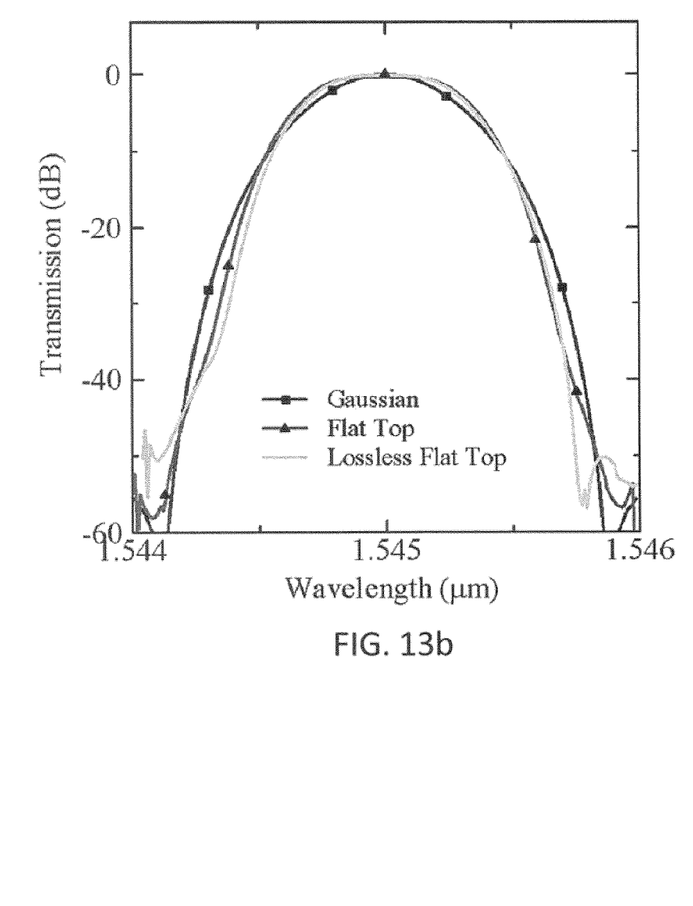
FIG. 13B is a graph of transmission in dB versus frequency showing the loss of a conventional AWG, the loss associated with an optical circuit illustrated in FIG. 2A implemented with an adiabatic coupler, and the loss associated with an optical circuit illustrated in FIG. 2A implemented with an interferometric combiner as illustrated in FIG. 12B.

FIGS. 13A and 13B illustrate the response of a conventional AWG, the response of an AWG configured with an optical circuit 200, and the response of an AWG configured with an optical circuit 200 and improved output waveguides 900. As shown in FIGS. 13A and 13B, the response of the AWG configured with an optical circuit as described herein is improved by implementing output waveguides 900 that include a rephasing portion 902.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:
1. An optical system, comprising:
   a first waveguide configured to support a first and second modes of an optical input signal, the second mode being of a higher order than the first mode;
   a second waveguide having an input configured to receive a portion of the optical input signal;

a dispersion element disposed along a length of one of the first and second waveguides, the dispersive element including a waveguide segment configured to induce a first frequency-dependent phase shift in one of the portions of the optical input signal;

a coupler configured to couple the portion of the optical input signal from the second waveguide into the first waveguide, the coupling of the portion of the optical input signal from the second waveguide into the first waveguide exciting the second mode of the optical input signal and generating a multimode optical signal that includes a plurality of modes; and an arrayed waveguide grating (AWG) in signal communication with an output of the first waveguide, the AWG configured to receive multimode optical signal from the output of the input waveguide.

2. The optical system of claim 1, wherein the dispersive element is a ring resonator.

3. The optical system of claim 1, wherein the dispersive element is an optical differential delay line.

4. The optical system of claim 1, further comprising a second dispersive element disposed along the other of the first waveguide and the second waveguide, the second dispersive element configured to generate a second frequency-dependent phase shift in the other portion of the optical input signal.

5. The optical system of claim 1, wherein the coupler is configured to evanescently couple the portion of the optical input signal from the second waveguide into the first waveguide.

6. The optical system of claim 5, wherein the coupler includes: a portion of the second waveguide having a first width; and a portion of the first waveguide having a second width, the second width being greater than the first width.

7. The optical system of claim 1, wherein the AWG includes a plurality of output waveguides, each of the output waveguides including an interferometric combiner comprising:

a first section having a first width, the first section defining a central axis; and a second section having an adiabatic taper from a second width to a third width, the s second section defining a central axis, the second width less than the first width and greater than the third width, the second section connected to the first section such that the central axis of the first section is not co-linear with the central axis of the second section.

8. The optical system of claim 1, wherein the AWG includes a plurality of output waveguides, each of the output waveguides including a multimode interference combiner.

9. An optical system, comprising:

a first waveguide having an input and an output, the first waveguide configured to support first and second modes of an optical input signal, the second mode being of a higher order than the first mode;

a second waveguide having an input and an output, the input of the second waveguide configured to receive a portion of the optical input signal;

a first dispersive element disposed along a length of one of the first or second waveguides, the first dispersive element including a waveguide segment configured to induce a frequency-dependent phase shift in one of the portions of the optical input signal; and a coupler configured to couple the portion of the optical input signal in the second waveguide and the portion of the optical input signal in the first waveguide into the first waveguide, the coupling exciting the second mode of the optical signal in the first waveguide generating a multimode optical signal that includes a plurality of modes.

10. The optical system of claim 9, further comprising an arrayed waveguide grating (AWG) in signal communication with the output of the first waveguide, the AWG configured to receive the multimode optical signal.

11. The optical system of claim 9, wherein the coupler is configured to evanescently couple the portion of the optical input signal in the second waveguide into the first waveguide.

12. The optical system of claim 11, wherein the coupler includes: a portion of the first waveguide having a first width; and a portion of the second waveguide having a second width, the second width smaller than the first width.

13. The optical system of claim 10, wherein the AWG includes a plurality of output waveguides, each of the output waveguides including an interferometric combiner.

14. The optical system of claim 13, wherein the interferometric combiner includes:

a first section having a first width and defining a central axis; and a second section having an adiabatic taper from a second width to a third width, the second width less than the first width and greater than the third width, the second section defining a central axis that is not linearly aligned with the central axis of the first section.

15. The optical system of claim 10, wherein the AWG includes a plurality of output waveguides, each of the output waveguides includes a multimode interference (MMI) combiner.

16. An optical system, comprising:

a waveguide configured to support first and second modes of an optical input signal;

a coupler disposed along a length of the waveguide, the coupler configured to receive one of the first or second modes of the optical signal and excite the other of the first or second modes of the optical input signal, the exciting of the other mode of the optical input signal generating a multimode optical signal in the waveguide; and a dispersive element disposed along the length of the waveguide, the dispersive element including a waveguide segment configured to induce a frequency-dependent phase shift in one of the modes of the multimode mode optical signal that includes a plurality of modes.

17. The optical system of claim 16, further comprising an arrayed waveguide grating (AWG) in signal communication with an output of the waveguide, the AWG configured to receive the multimode optical signal.

18. The optical system of claim 17, wherein the AWG includes a plurality of output waveguides, each of the output waveguides including an interferometric combiner.

19. The optical system of claim 18, wherein the interferometric combiner includes:

a first section having a first width and defining a central axis; and a second section having an adiabatic taper from a second width to a third width, the second width less than the first width and greater than the third width, the second section defining a central axis that is not linearly aligned with the central axis of the first section.

20. The optical system of claim 17, wherein each of the output waveguides includes a multimode interference (MMI) combiner.

* * * * *